United States Patent [19]

Buikema

[11] Patent Number: 4,488,213
[45] Date of Patent: Dec. 11, 1984

[54] ENERGY CONVERTER

[75] Inventor: Wolter Buikema, Hengelo, Netherlands

[73] Assignee: Hollandse Signaalapparaten B.V., Hengelo, Netherlands

[21] Appl. No.: 398,174

[22] Filed: Jul. 14, 1982

[30] Foreign Application Priority Data

Jul. 23, 1981 [NL] Netherlands ............... 8103474

[51] Int. Cl.³ .................. H02M 3/315; H02H 7/122
[52] U.S. Cl. ........................... 363/58; 363/28; 363/96
[58] Field of Search ................. 363/27–28, 363/57–58, 96, 135–138

[56] References Cited

U.S. PATENT DOCUMENTS 3,483,462 12/1969 Bedford ................. 363/137 X
3,852,656 12/1974 Bourbeau ............... 363/58
3,953,779 4/1976 Schwarz ................. 363/28
4,191,994 3/1980 Kratz et al. ............. 363/138 X

FOREIGN PATENT DOCUMENTS 0066278 5/1980 Japan ...................... 363/27

Primary Examiner—Peter S. Wong
Attorney, Agent, or Firm—Bernard Franzblau

[57] ABSTRACT

An energy converter comprising a series-resonant bridge circuit (1) containing at least two thyristors (6, 7), first and second respective diodes (8, 9) connected antiparallel thereto, a high-frequency output transformer (23), and an energy buffer (2). A control circuit (20) is incorporated for generating trigger pulses for the appropriate thyristors in response to the energy of the buffer (2). The energy converter comprises means for ensuring that the diode, antiparallel connected to the last-conducting thyristor, starts to draw current immediately after this thyristor is blocked. The control circuit also generates signals indicative of the presence of current flowing through the diodes (8, 9), which signals control the supply of the trigger pulses to the thyristors (6, 7).

15 Claims, 12 Drawing Figures

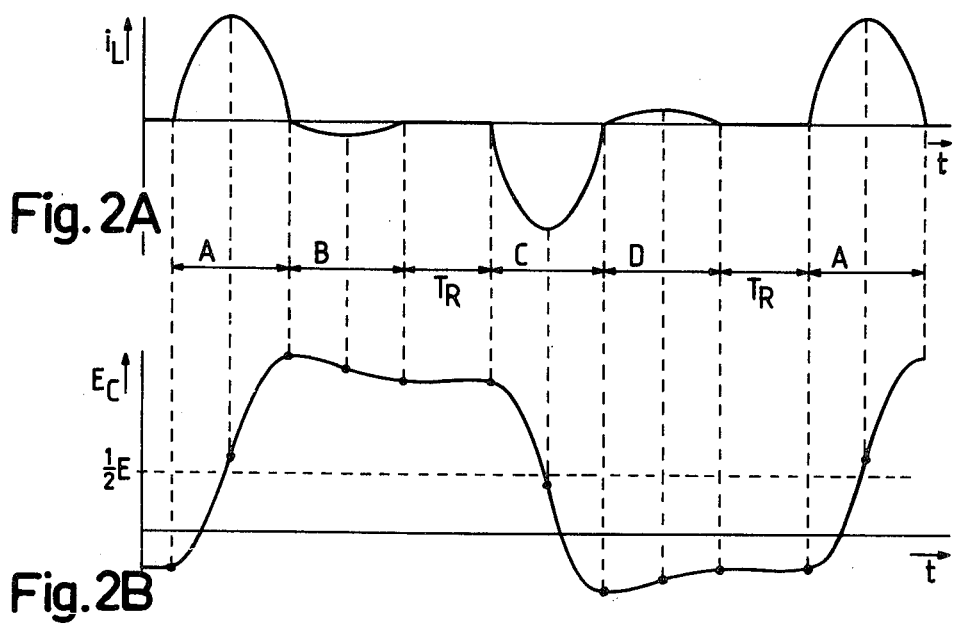
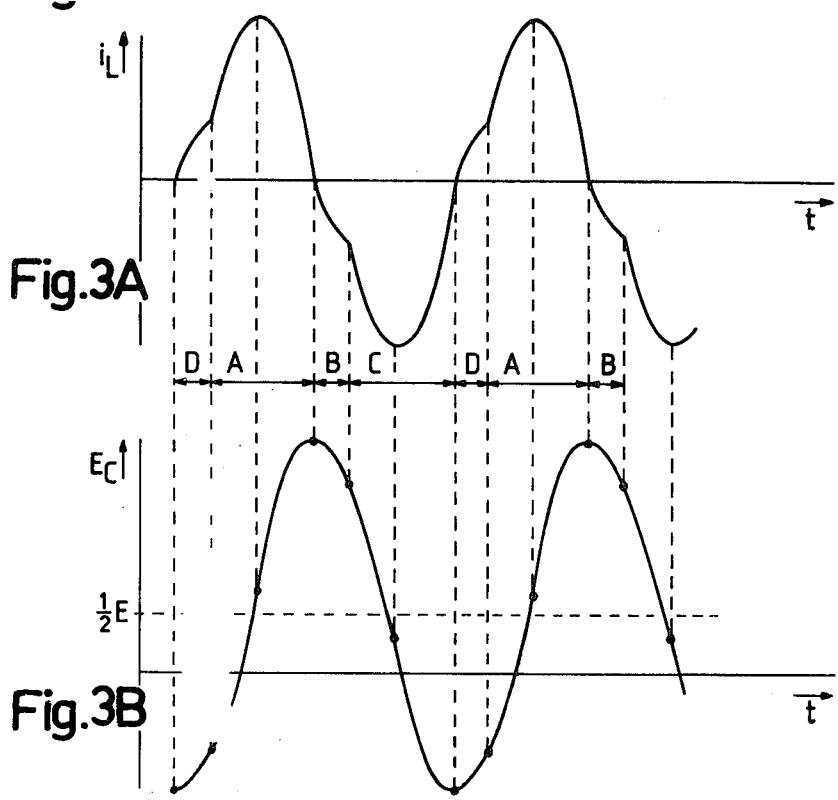

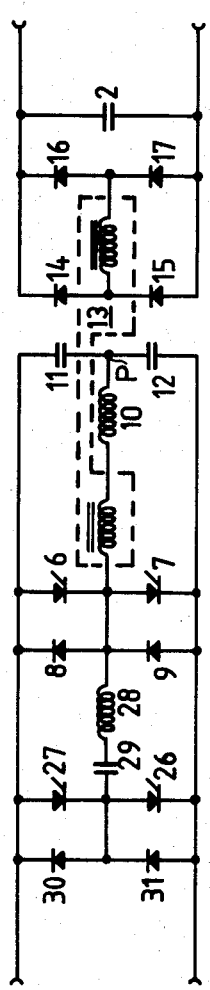
Fig. 5
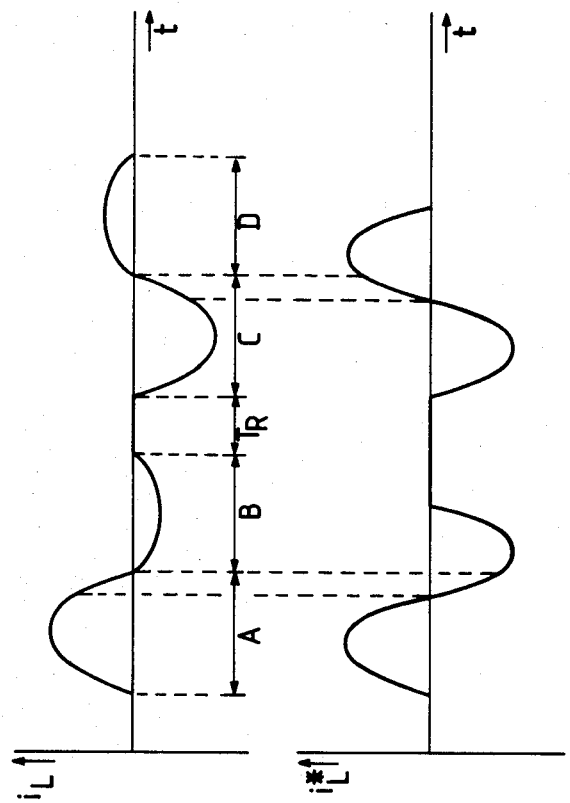
Fig. 6A
Fig. 6B

ENERGY CONVERTER

This invention relates to an energy converter, whereby a load is supplied with energy from a source, utilising a series-resonant bridge circuit containing at least two thyristors, diodes antiparallel connected thereto and a high-frequency output transformer, and an energy buffer. A control circuit is provided for generating trigger pulses in response to the energy supplied to and extracted from the buffer so as to bring the appropriate thyristors into the conducting state.

Such energy converters have been known for a long time and their purpose is to convert the energy from a single phase or a polyphase AC source or from a DC source into energy with a single phase or polyphase AC voltage of a different amplitude and/or frequency, or into a pulsating voltage or a DC voltage. With the relevant thyristors of the bridge circuit in the conducting state, energy from the source is supplied to an energy buffer via the series resonant circuit, and energy is extracted from the buffer by the load. During the time the thyristors are in the conducting state the energy supplied to the buffer may be returned to the source or may be extracted by the load. The energy balance setting is determined by the times at which the thyristors of the bridge circuit are triggered.

An energy converter as set forth in the opening paragraph is disclosed, for example, in the U.S. Pat. No. 3,953,779. In this patent the energy converter comprises a control circuit for delivering, in response to the current flowing in the series resonant bridge circuit and to a voltage derived from the output voltage of the output transformer, trigger pulses to bring the appropriate thyristors into the conducting state. It may however occur that a thyristor of the bridge circuit remains in the conducting state for a longer time than intended, while a thyristor connected in series therewith should already have been brought into the conducting state. Should the latter occur, this means a short-circuit will occur in the bridge circuit. The present invention has for its object to obviate this shortcoming.

According to the invention, the energy converter, as set forth in the opening paragraph, comprises means for ensuring that the diode, antiparallel connected to the last-conducting thyristor, starts to draw current immediately after said thyristor is blocked, while the control circuit comprises diode current detectors for supplying signals indicative of the presence of current flowing through said diodes, and switching means for passing the trigger pulses to the thyristors in the bridge circuit, conditional upon the presence of current flowing through the respective diodes antiparallel connected to the thyristors conducting last and directly before said diodes.

Although the diode current detectors and the switching means will as good as prevent short-circuiting in the bridge circuit, these measures appear to introduce other imperfections. These consist in the diode current detectors sometimes failing to establish a flow of current in a particular diode, whereas the antiparallel-connected thyristor conducting last is blocked. The result is that the control circuit fails to supply a trigger pulse for the other appropriate thyristor in the bridge circuit so that the output voltage decreases. Therefore, means are provided to ensure that the diode antiparallel connected to the thyristor last conducting starts drawing current immediately after the blocking of this thyristor.

The invention will now be explained with reference to the accompanying drawing, in which:

FIGS. 2A, 2B, 3A, 3B, 4A and 4B are diagrams useful in explaining the operation of the energy converter of FIG. 1;

FIG. 5 is a second embodiment of the energy converter according to the invention;

FIGS. 6A and 6B are diagrams illustrating the operation of the energy converter of FIG. 5.

Figure 1:
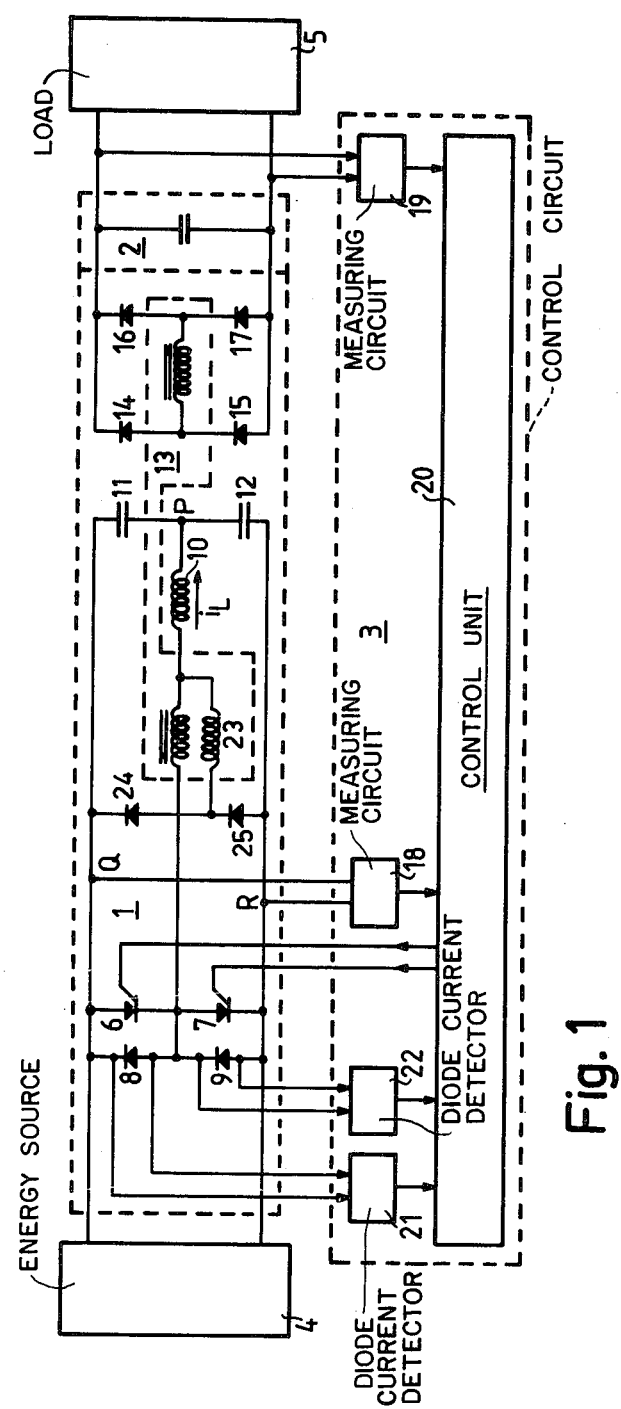
FIG. 1 is an embodiment of the energy converter according to the invention.
Figure 7:
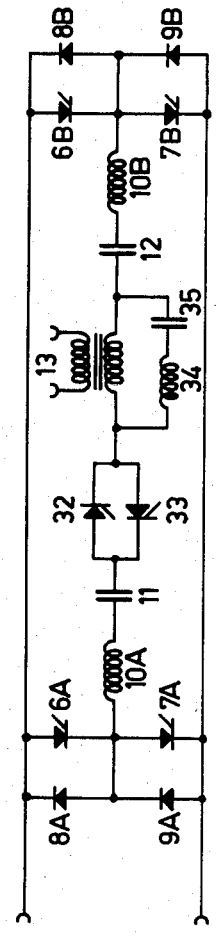
FIGS. 7 and 8 are a third and fourth embodiment of the energy converter according to the invention.
Figure 8:
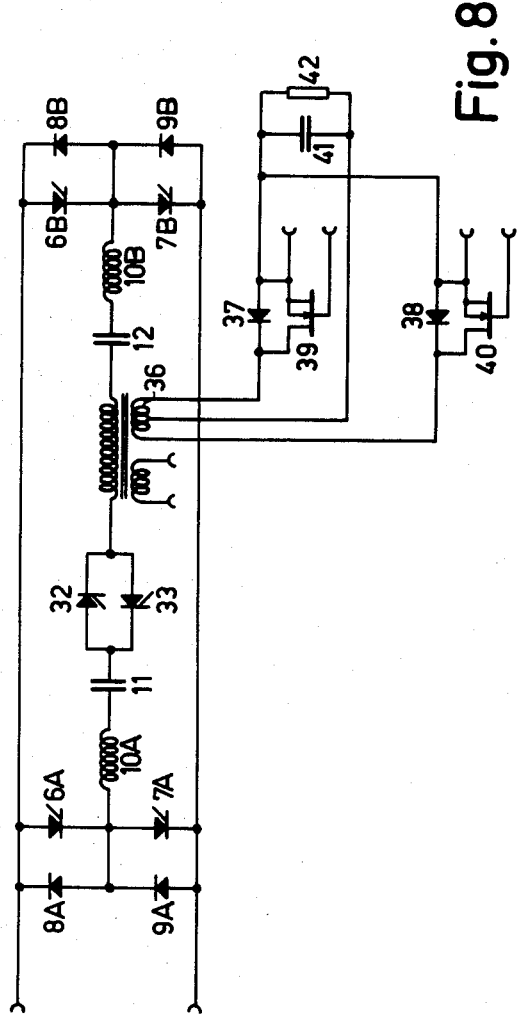

In the embodiments shown in FIGS. 1 and 5 a "half bridge circuit" is employed. The application of a full bridge circuit is shown in the embodiments of FIGS. 7 and 8.

The energy converter of FIG. 1 comprises a series resonant bridge circuit 1, an energy buffer 2 and a control circuit 3. Energy from a source 4 is supplied to a load 5 via bridge circuit 1 and buffer 2. The series resonant bridge circuit 1 comprises two thyristors 6 and 7 (and hence a half bridge circuit), diodes 8 and 9 connected antiparallel to thyristors 6 and 7 respectively, a coil 10, capacitors 11 and 12, a high-frequency output transformer 13 and four rectifier diodes 14 to 17. The operation of such a series resonant bridge circuit is known and described in IEEE Transactions on Industrial Electronics and Control Instrumentation, Volume IECI-17, No. 3, May 1970, pp. 209–221 and Volume IECI-23, No. 2, May 1976, pp. 142–149, and in the cited U.S. Pat. No. 3,953,779.

FIG. 2A shows the flow of current $i_L$ through coil 10 and FIG. 2B the voltage $E_C$ at point P. In phase A (thyristor phase) thyristor 6 is in the conductive state. Current $i_L$ increases in the first instance, causing the voltage $E_C$ to rise, whereupon the current $i_L$ again decreases to zero and the voltage $E_C$ assumes its maximum value. As soon as current $i_L$ is zero, thyristor 6 ceases to conduct and an opposite current flows through diode 8. In the then commencing phase B (diode phase) this diode current causes the voltage $E_C$ to decrease slightly. When the diode current is finally zero, the voltage $E_C$ remains constant until thyristor 7 is brought in the conductive state. In thyristor phase C and the subsequent diode phase D the current $i_L$ is equal, but opposite to that in phases A and B respectively, while voltage $E_C$, relative to the voltage $\frac{1}{2}E$, is equal but opposite to that in phases A and B, where E is the voltage between points Q and R. FIG. 3A shows the flow of current $i_L$ through coil 10 and FIG. 3B the voltage $E_C$ at point P in the case when the thyristors are already in the conductive state. Such a situation is termed the "indented mode". The situation shown in FIGS. 2A and 2B is designated as the "trigger mode".

In phases A and C, energy from source 4 is supplied to energy buffer 2 and extracted from this buffer by load 5. In phases B and D, a portion of the energy supplied to buffer 2 is returned to the source via the series resonant circuit and a portion is extracted by load 5. Depending on the energy supplied to the series resonant circuit and the energy extracted from the buffer, it is possible to create an equilibrium where the amount of energy at buffer 2 is kept constant by appropriately setting the firing instants of thyristors 6 and 7. In this situation the magnitude of the voltage across the primary winding of output transformer 13 is in fact constant and the resonant frequency of the circuit is determined by the product LC, where L is the self-induction of coil 10 and ½C the capacitance of each of capacitors 11 and 12.

The setting of the energy balance is effected in control circuit 3. This circuit comprises a measuring circuit 18 for the input voltage of the series resonant circuit, a measuring circuit 19 for the voltage across buffer 2, and a control unit 20 for generating the trigger pulses for thyristors 6 and 7 at the appropriate times, depending on the output signals of the measuring circuits 18 and 19. To prevent short-circuiting in the series resonant circuit, the trigger pulse for thyristor 6 may be supplied only if thyristor 7 is blocked and, conversely, the trigger pulse for thyristor 7 may be supplied only if thyristor 6 is blocked. Thyristors 6 and 7 are blocked when, respectively, diodes 8 and 9 are brought into the conductive state. To establish this state, control circuit 3 comprises another two diode current detectors 21 and 22 for supplying signals indicative of current flowing in diodes 8 and 9, respectively. Control unit 20 comprises switching means for passing the thyristor trigger pulses in response to the reception of the above signals.

Figures 4A, 4B:
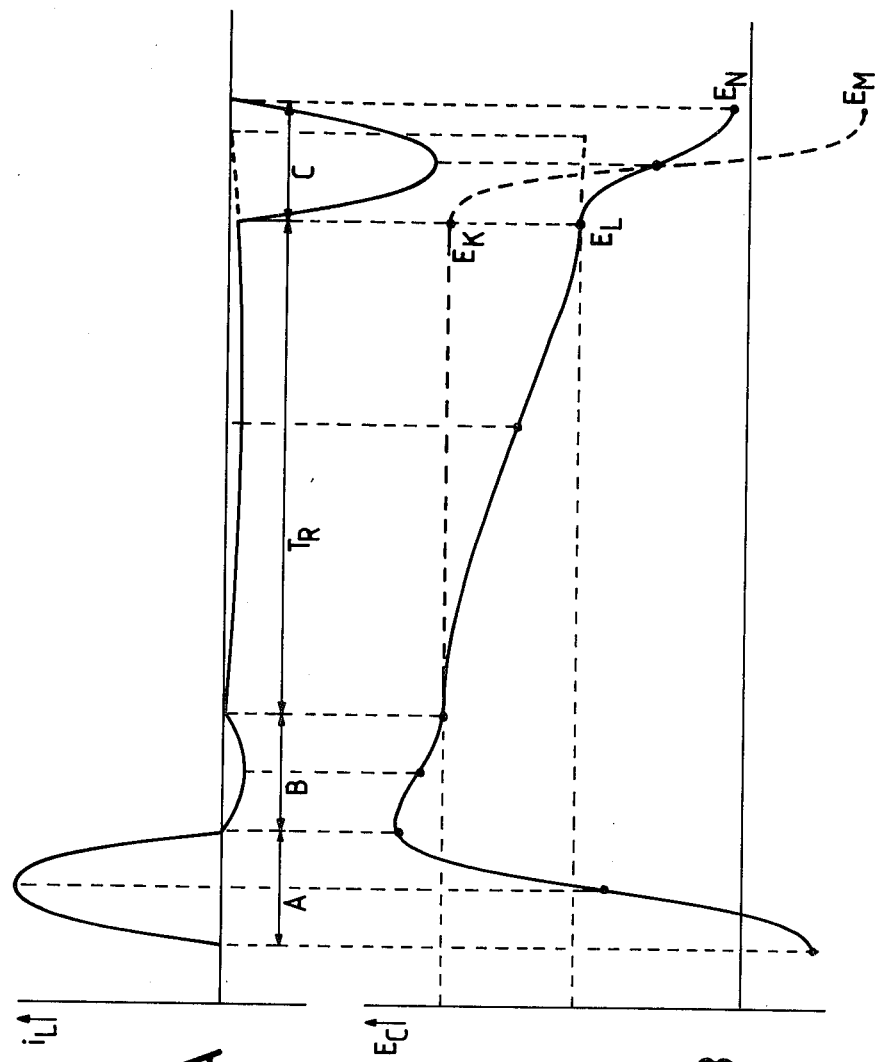

In the trigger mode there is in general a dwell time between the instant at which one diode ceases to conduct and the instant at which the thyristor connected antiparallel to the other diode is brought in the conductive state. In FIG. 2A this dwell time between phases B and C and between phases D and A is indicated by $T_R$. During time $T_R$ the voltage $E_C$ will decay through the primary winding of the output transformer 13, the coil 10 and, depending on the value of $E_C$, through one of diodes 8 and 9. Since the self-induction $L_p$ of the primary winding of the output transformer is much greater than the self-induction L of coil 10, the series resonant circuit has a resonant frequency determined by the product $L_p C$. FIG. 4A shows the flow of current in the series resonant circuit in phases A, B and C and dwell time $T_R$. The current flowing during time $T_R$ causes the voltage $E_C$ at point P to decrease. FIG. 4B shows the decrease of this voltage from $E_K$ to $E_L$ at the start of phase C and the increase of this voltage from $E_M$ to $E_N$ at the end of phase C. Because of the voltage drop at point P during dwell time $T_R$, the voltage $E_C$ after phase C is able to assume such a value that the diode connected antiparallel to the thyristor conducting in phase C remains blocked. That is, after one of the thyristors has ceased to conduct, it may occur that the diode connected antiparallel thereto fails to conduct and, hence, blocks the supply of the trigger pulse for the next thyristor. Consequently, the output voltage drops below the set value, causing a large ripple on the output voltage.

To prevent this effect, the energy converter comprises means for ensuring that the diode connected antiparallel to the thyristor last conducting starts drawing current immediately after this thyristor is blocked. In the embodiment of FIG. 1 such means consists of an auxiliary winding 23 accommodated in output transformer 13, one end of the auxiliary winding being connected to an end of the primary winding and the other end to the voltage across the bridge circuit via two diodes 24 and 25. The auxiliary winding is so arranged that, if the diodes connected antiparallel to the thyristors draw a current, the auxiliary winding-induced voltage across the primary winding compensates for the voltage impressed on the primary winding in the absence of the auxiliary winding. Thus in the diode phases B and D the voltage across the output transformer is made zero, so that there is no damping in the subsequent dwell time. At the same time it is prevented that the core of the output transformer becomes saturated through the above damping effect. Consequently, asymmetry in the resonant current and noise are banished.

In the embodiment of FIG. 5 the series resonant bridge circuit, as depicted in FIG. 1, is combined with a second series resonant bridge circuit. The second bridge circuit consists of thyristor pairs 6, 26 and 7, 27, coil 28 and capacitor 29. Across thyristors 26 and 27 are diodes 30 and 31 in antiparallel connection. The self-induction of coil 28 and the capacitance of capacitor 29 are so selected that the resonant frequency of the second bridge circuit is higher than that of the first bridge circuit, but is less than twice that of the first bridge circuit. FIG. 6A shows the flow of current $i_L$ through coil 10 and FIG. 6B the flow of current $i_L^*$ through coil 28. The second bridge circuit insures that under all conditions the diode 8 or 9 draws a current immediately after thyristor 6 or 7 is blocked, whatever be the voltage $E_C$ at point P during dwell time $T_R$. In thyristor phase A, first the thyristors 6 and 26 are in the conductive state and then thyristor 6 and diode 31. In diode phase B, first the diodes 8 and 31 are in the conductive state and then the diode 8 only. If the voltage $E_C$ at point P is such that, after the thyristor 6 ceases to conduct, there is no current flow from point P through coil 10 and diode 8, a current will flow through diode 8 via coil 28, enabling the relevant diode current detector to pass the trigger pulse for the next thyristor (7).

In the embodiments of FIGS. 1 and 5 the series resonant bridge circuits are in a half bridge configuration. FIG. 7 shows an embodiment in a full bridge configuration. The bridge circuit is constituted by thyristor pairs 6A, 7B and 6B, 7A, coils 10A and 10B and capacitors 11 and 12. Across thyristors 6A, 7B, 7A and 7B are again diodes 8A, 8B, 9A, 9B in antiparallel connection. The operation of this series resonant bridge circuit is identical to that shown in FIGS. 1 and 5. Also, this series resonant bridge circuit suffers from the fault that in the trigger mode it may happen that the diodes connected antiparallel to the thyristors conducting last remain blocked. This fault is obviated here by inserting two antiparallel connected thyristors 32 and 33 in the bridge. Thyristor 32 is triggered at the same time as thyristors 6A and 7B and at the same time diodes 8B and 9A start conducting. Thyristor 33 is triggered at the same time as thyristors 6B and 7A and at the same time diodes 8A and 9B start conducting. Thus thyristor 32 will be triggered at the start of phase A, thyristor 33 at the start of both phases B and C, and thyristor 32 again at the start of phase D. The trigger pulse supplied from control unit 20 to thyristor 32 must in any case be of longer duration than the period required for extinguishing thyristor 33. Conversely, the trigger pulse supplied from control unit 20 to thyristor 33 must be of longer duration than the period required for extinguishing thyristor 32. Because of the current flow in the series resonant circuit during dwell time $T_R$ it may occur that thyristor 33 is not extinguished by the end of phase B or thyristor 32 by the end of phase D. To prevent such a situation, various measures may be taken. A feasible measure is the insertion of an LC network consisting of coil 34 and capacitor 35 across the output transformer 13 in the bridge circuit. The frequency of the oscillating circuit defined by this network is much greater than that defined by coils 10A and 10B and capacitors 11 and 12. This oscillating circuit oscillates continuously during the thyristor and diode phases. The driving force is the output voltage, i.e. the voltage across output transformer 13. Since after a diode phase the voltage across the output transformer always drops to a smaller value, the oscillating circuit will conduct its current via thyristors 32 or 33. This current flow will be maintained until the thyristor still conducting is extinguished.

Another measure to prevent thyristor 32 or 33 from continuing to conduct during the dwell time is shown in FIG. 8. Also in this figure, the series resonant bridge circuit consists of a full bridge configuration. The measure taken consists in providing an addditional winding 36 in the output transformer 13, a rectifier circuit constituted by diodes 37 and 38, two FET switches 39 and 40 and an RC network constituted by capacitor 41 and load resistance 42. By closing the particular FET switch at a certain time after the termination of phase B or C, the capacitor 41, charged during the preceding thyristor and diode phases, discharges and causes in the bridge circuit a voltage which extinguishes the last conducting thyristor of thyristors 32 and 33. The FET switches are controlld from control unit 20. At the start of dwell time $T_R$ the control unit 20 delivers the trigger pulse for the particular FET switch. The duration of this trigger pulse is in any case such that the relevant thyristor is extinguished within this period.

I claim:

1. An energy converter for supplying a load with energy from a voltage source comprising, a series-resonant bridge circuit coupled to the voltage source and including at least two thyristors each having a respective diode connected antiparallel thereto and a high-frequency output transformer coupled to the load and to an energy buffer, a control circuit for generating trigger pulses for the thyristors in response to energy supplied to and extracted from the buffer to bring the appropriate thyristors into the conducting state, means for ensuring that the diode, anti-parallel connected to the last-conducting thyristor, starts to draw current immediately after said thyristor is blocked, the control circuit including diode current detectors for supplying signals indicative of the presence of a current flowing through said diodes, and switching means for passing the trigger pulses to the thyristors in the bridge circuit conditional upon the presence of a current flowing through the respective diodes antiparallel connected to the thyristors last conducting.

2. An energy converter as claimed in claim 1 wherein the current ensuring means comprises an auxiliary winding of the output transformer, one end of said auxiliary winding being connected to an end of a primary winding of said output transformer and the other end to the voltage across the bridge circuit via two diodes and in such a way that, when the diodes antiparallel connected to the thyristors, are drawing a current, the auxiliary winding-induced voltage across the primary winding compensates for a voltage impressed on the primary winding in the absence of the auxiliary winding.

3. An energy converter as claimed in claim 1 wherein the current ensuring means comprises a second series resonant bridge circuit including, in addition to said first two thyristors which form a part of the first resonant bridge circuit, a pair of third and fourth thyristors with respective diodes connected antiparallel thereto, said second resonant bridge circuit having a resonant frequency which is higher than that of the first resonant bridge circuit but less than twice the resonant frequency of the first resonant bridge circuit.

4. An energy converter as claimed in claim 1 wherein the current ensuring means comprises two antiparallel connected thyristors connected in the resonant bridge circuit so as to prevent any current flow in the bridge circuit during a dwell time that occurs when the energy converter operates in a trigger mode.

5. An energy converter as claimed in claim 4, further comprising an LC network connected across the output transformer for extinguishing the relevant thyristor of the two antiparallel connected thyristors at the start of the dwell time.

6. An energy converter as claimed in claim 4, further comprising a rectifier circuit, two FET switches and an RC network coupled to the resonant bridge circuit for generating, at the start of the dwell time, a voltage in the resonant bridge circuit via an additional winding on the output transformer, which voltage causes the relevant thyristor of the two antiparallel connected thyristors to extinguish.

7. An energy converter for coupling a load to a source of electric energy comprising, a first series-resonant bridge circuit coupled to the energy source and including at least two thyristors with respective diodes connected antiparallel thereto and a high-frequency output transformer coupled to an energy buffer, a control circuit comprising means for detecting the presence of a current flowing through said diodes for supplying signals indicative thereof and means for generating thyristor trigger pulses in response to energy supplied to and extracted from the energy buffer and in response to signals from the diode current detecting means to trigger the appropriate thyristors into the conducting state, and means for ensuring that the diode, antiparallel connected to the last-conducting thyristor, starts to draw current immediately after said thyristor is blocked.

8. An energy converter as claimed in claim 1 wherein the energy buffer comprises a capacitor.

9. A converter for coupling a source of electric energy to a load comprising, a series resonant bridge circuit including first and second series coupled controlled rectifiers and first and second diodes respectively connected in antiparallel configuration therewith, a storage capacitor, a transformer having a primary winding connected in said resonant circuit and a secondary winding coupled to the storage capacitor, a control circuit for generating and supplying trigger pulses to control electrodes of the first and second controlled rectifiers to alternately trigger the first and second controlled rectifiers into conduction in mutually exclusive time intervals, said control circuit including means for deriving a first signal indicative of current flow in said diodes and means for developing a second signal determined by the capacitor voltage, said control circuit supplying said trigger pulses in response to said first and second signals, and means for causing a current to flow in the diode connected antiparallel to the last conducting controlled rectifier and immediately after said controlled rectifier turns off.

10. A converter as claimed in claim 9 wherein said control circuit further comprises means for producing a third signal determined by the resonant bridge circuit input voltage, said third signal further controlling the time of occurrence of the trigger pulses supplied by the control circuit.

11. A converter as claimed in claim 9 wherein said current causing means comprises an auxiliary winding on the transformer having one end connected to one end of said primary winding and another end connected to first and second input terminals of the resonant bridge circuit via third and fourth diodes, respectively.

12. A converter as claimed in claim 11 wherein the resonant bridge circuit further comprises first and second capacitors serially connected across the first and second bridge input terminals, and an inductor connected in series with the transformer primary winding between a junction point between the first and second capacitors and a junction point between the series coupled controlled rectifiers.

13. A converter as claimed in claim 9 wherein said current causing means comprises a further series resonant bridge circuit comprising said first and second series coupled controlled rectifiers and third and fourth series coupled control rectifiers with third and fourth diodes respectively connected in antiparallel configuration therewith, the resonant frequency of the further resonant bridge circuit being higher than but less than twice the resonant frequency of the first resonant bridge circuit.

14. A converter as claimed in claim 9 wherein said current causing means comprises third and fourth antiparallel connected controlled rectifiers connected in series with the transformer primary winding between output terminals of the resonant bridge circuit.

15. A converter as claimed in claim 14 further comprising a series LC network coupled across the transformer primary winding and operative to cut-off the relevant one of said third and fourth controlled rectifiers.

* * * * *